| United States Patent [19] | [11] 3,923,765 |
| --- | --- |
| Goetze et al. | [45] Dec. 2, 1975 |

[54] PROCESS FOR SUSPENSION POLYMERIZATION OF VINYL HALIDES WITH LOW POLYMER DEPOSITION

[75] Inventors: Ulrich Goetze, Cologne Bocklemund; Axel Wole, Cologne-Longerich; Gottfried Nettesheim, Pulheim; Thomas Balwé, Burghausen; Johann Bauer, Burghausen; Kurt Fendel, Burghausen; Dieter Kurz, Burghausen; Alex Sabel, Burghausen, all of Germany

[73] Assignee: Wacker-Chemie G.m.b.H., Munich, Germany

[22] Filed: Mar. 7, 1973

[21] Appl. No.: 338,840

[30] Foreign Application Priority Data

Oct. 4, 1972 Germany............................ 2248607

[52] U.S. Cl. ...... 260/92.8 W; 260/78.5 R; 260/78.5 UA; 260/85.5 XA; 260/86.3; 260/87.1; 260/87.5A; 260/87.5 C; 260/92.1
[51] Int. Cl.$^2$................. C08F 114/02; C08F 114/16
[58] Field of Search...... 260/92.8 R, 92.8 W, 94.9 P

[56] References Cited
UNITED STATES PATENTS

| 2,576,720 | 11/1951 | Marks............................ 260/92.8 W |
| 3,488,328 | 1/1970 | Koyanagi et al. ............. 260/92.8 W |
| 3,544,539 | 12/1970 | Koyanagi et al. ............. 260/92.8 W |
| 3,562,238 | 2/1971 | Parks............................ 260/92.8 W |
| 3,663,520 | 5/1972 | Balwe et al. .................. 260/92.8 W |
| 3,738,974 | 6/1973 | Takehisa et al............... 260/92.8 W |
| 3,749,555 | 7/1973 | Beckmann et al............. 260/94.9 P |

OTHER PUBLICATIONS

R. G. R. Bacon, "The Initiation of Polymerization Processes by Redox Catalysts," Quarterly Reviews, Vol. 9, 1955, pp. 287–291.

Primary Examiner—Joseph L. Schofer
Assistant Examiner—Herbert J. Lilling
Attorney, Agent, or Firm—Hammond & Littell

[57] ABSTRACT

An improvement in the suspension polymerization of a polymerizate containing at least 70 percent of polyvinyl halides with no polymer deposits by the steps of mixing (1) monomers selected from the group consisting of vinyl halides and mixtures of vinyl halides with up to 30 percent by weight of olefinically unsaturated compounds copolymerizable with vinyl halides, (2) an oil-soluble free-radical-forming polymerization catalyst, (3) suspension stabilizers including protective colloids, and (4) water, heating said mixture under agitation to polymerization temperatures and recovering said polymerizate, the improvement comprises conducting the polymerization in the presence of from 2 to 2,000 ppm, based on the water content, of water-soluble reducing agents, in a reactor whose inner surface has a mean peak-to-valley height of at most 10 $\mu$ and where the flow velocity on said inner surface is at least 0.3 m/sec., whereby a polymerizate is recovered substantially without polymer deposits.

6 Claims, No Drawings

PROCESS FOR SUSPENSION POLYMERIZATION OF VINYL HALIDES WITH LOW POLYMER DEPOSITION

THE PRIOR ART

In the production of polyvinyl halides by suspension polymerization, the inner wall of the polymerization reactors are generally incrusted with a more or less thick polymer deposit. These wall deposits interfere with the regulation of the elimination of the heat of polymerization, because of the thermal insulation which manifests itself particularly in very large reactors, which are of economical interest. This has the result that it is only possible to work at very low polymerization rates and with corresponding time consumption. If a cooling brine is used, the polymerization time can be reduced, but this involves, apart from the higher costs, a certain safety risk caused by a possible failure of the cooling unit.

Another drawback is that the wall coating peels off in the course of the polymerization and contaminates the polymer. This leads to the formation of specks in the finished product, particularly in polyvinyl chloride.

For these reasons polymerization reactors have been thoroughly cleaned after each charge, which is not only expensive but results in a marked reduction of the capacity of the plant.

Various measures have already been described to avoid these polymer deposits. For example, it has been suggested to spray certain substances on the walls of the autoclaves (DOS No. 1,442,705). But this spraying must be repeated before each charge and thus hardly represents any progress. Furthermore, it has been suggested to add sequestering agents or magnesium oxide to the polymerization charge, but the effect of these additions is minor. Stopping the stirrer at a monomer conversion of 15 to 40 percent by weight has also been recommended. Apart from the fact that these measures are not very effective, the polymerization can only be effected at a very low speed when the stirrer is disconnected, particularly in the large autoclaves which are generally used today. Furthermore the addition of oxidizing heavy metal compounds to the polymerization charge has also been described. But the products obtained do not meet the quality requirements regarding thermal stability and the method has little effect on the amount deposited on the wall.

Summarizing it can be said that no method is known so far which prevents wall deposits of polymers completely. But only complete prevention of the formation of deposits would make it possible to operate reactors without the time-consuming steps of opening, ventilation and cleaning, and at a high polymerization rate. Besides, continuous polymerization is only possible in practice if there is no incrustation of the reactor walls.

OBJECTS OF THE INVENTION

An object of the present invention is the development of improved processes for the suspension polymerization of vinyl chlorides where the polymer deposits are completely eliminated on all inner surfaces of the reactors thus enabling repeated polymerizations in the reactor without necessity for its cleaning after each polymerization.

Another object of the present invention is the development, in the suspension polymerization process for the production of polymerizates containing at least 70% of polyvinyl halides, with low polymer deposits, which comprises the steps of mixing (1) monomers selected from the group consisting of vinyl halides and mixtures of vinyl halides with up to 30 percent by weight of olefinically unsaturated compounds copolymerizable with vinyl halides, (2) an oil-soluble free-radical-forming polymerization catalyst, (3) suspension stabilizers including protective colloids, (4) water, heating said mixture under agitation to a polymerization temperature of between 30°C and 80°C, and recovering said polymerizate, of the improvement which consists of conducting said polymerization in the presence of from 2 to 2,000 ppm, based on the water content, of water-soluble reducing agents, in a reactor whose inner surface has a mean peak-to-valley height of at most 10 $\mu$ and where the flow velocity adjacent said inner surface is at least 0.3 m/sec., whereby a polymerizate is recovered substantially without polymer deposits.

These and other objects of the invention will become more apparent as the description thereof proceeds.

DESCRIPTION OF THE INVENTION

The subject of the invention is a method for the production of polyvinyl halides or copolymers of the vinyl halides with olefinically unsaturated monomers by polymerization of the monomers in aqueous suspension in the presence of oil-soluble catalysts, dispersing agents, and, if necessary, additional polymerization aids in a reactor, characterized in that the polymerization is effected in the presence of water-soluble reducing agents in amounts of 2 to 2000 ppm, preferably 10 to 300 ppm, based on the water content, and in a reactor whose inner surfaces have a mean peak-to-valley height of not more than 10 $\mu$, preferably 1 $\mu$, and where the flow velocity on said inner surfaces is at least 0.3 m/sec., preferably 1 m/sec.

More particularly, the subject of the invention is an inprovement in the suspension polymerization process for the production of polymerizates containing at least 70 percent of polyvinyl halides, with low polymer deposits, which comprises the steps of mixing (1) monomers selected from the group consisting of vinyl halides and mixtures of vinyl halides with up to 30 percent by weight of olefinically unsaturated compounds copolymerizable with vinyl halides, (2) an oil-soluble free-radical-forming polymerization catalyst, (3) suspension stabilizers including protective colloids, and (4) water, heating said mixture under agitation to a polymerization temperature of between 30°C and 80°C, and recovering said polymerizate, the improvement of which consists in conducting said polymerization in the presence of from 2 to 2,000 ppm, based on the water content, of water-soluble reducing agents, in a reactor whose inner surface has a mean peak-to-valley height of at most 10 $\mu$ and where the flow velocity adjacent said inner surface is at least 0.3 m/sec., whereby a polymerizate is recovered substantially without polymer deposits.

Due to the measures of the invention, the deposit of polymers on the inner surfaces of the reactors is completely prevented. This result is particularly surprising because, in contrast to the measures of the invention, the use of oxidizing agents and the temporary disconnection of the stirrer, that is, a velocity of flow of 0, have been recommended heretofore. The three measures characterizing the method according to the invention, namely, addition of the reducing agent, surface quality of the reactors, and flow velocity adjacent to the inner walls of the reactors, are only fully effective in combination. They are closely related to each other and influence each other. Thus, for example, the amount of reducing agents can be kept small with a particularly smooth surface (mean peak-to-valley height 1 $\mu$) especially when the flow velocity is high (about 1 m/sec.). Complete elimination of the reducing agent, however, leads to polymer deposits.

On the other hand, even a large amount of a strong reducing agent in a reactor with a rough wall will not completely prevent wall deposits, though it will reduce them. Finally a large amount of reducing agent in combination with a bright-polished surface of the reactor cannot prevent deposits at various points of the reactor if the velocity of flow is too low. This means that all three measures according to the invention must always be used simultaneously to achieve complete prevention of wall deposits.

It also has a favorable effect if the charging of the reactor is effected in the order (1) water with dispersing agent and all water-soluble additives, (2) monomers, and (3) subsequently catalysts. This has the effect that the water containing the reducing agent wets the entire inner surface of the reactor before the catalyst is added. It was found that the amount of reducing agent to be employed can be reduced by this advantageous, but not necessary, order of the charging. Furthermore, it is of advantage in some cases to keep the inner surfaces of the reactor at as low a temperature as possible.

Examples of vinyl halides with which the method of the invention can be carried out are vinyl chloride, vinyl fluoride, vinylidene fluoride, vinylidene chloride.

Examples of olefinically unsaturated compounds copolymerizable with vinyl halides which can be used as comonomers in amounts up to 30 percent by weight of the monomer charge are particularly vinyl esters of alkanoic acids with 2 to 20, preferably 2 to 4, carbon atoms, such as vinyl acetate, vinyl propionate, vinyl butyrate, vinyl 2-ethyl-hexanoate, vinyl esters of $\alpha$-branched alkanoic acids having 8 to 24 carbon atoms, such as "Versatic acids"; unsaturated carboxylic acids and their mono- or diesters with alkanols with 1 to 10 carbon atoms, such as acrylic acid, methacrylic acid, fumaric acid, maleic acid, and itaconic acid, such as 2-ethylhexyl acrylate, methyl methacrylate, maleic acid di- or mono-2-ethylhexyl ester, dioctyl fumarate; $\alpha$-olefins, such as ethylene, propylene, isobutylene, styrene; acrylonitrile; and also polyunsaturated compounds. Mixtures of the monomers can also be used. Both the comonomers and the vinyl halides can be added during the polymerization. When ethylene and propylene are used, up to 100 atmospheres are necessary in some cases.

The water used is mostly deionized water. The monomer-water ratio is not a determinant factor, frequently the amount of water is 40 to 70 percent by weight.

The temperature of the aqueous suspension is generally set at 30° to 80°C. The pressure is, as a rule, 1 to 15 atmospheres, but it depends essentially on the use of the comonomers, for example, if ethylene is used, pressures of up to 100 atmospheres are required. In general, the polymerization is effected under the autogenous pressure of vinyl chloride.

All compounds suitable for the free-radical polymerization of vinyl halides can be used as the oil-soluble free-radical-forming polymerization catalysts. Examples of such compounds are diarylperoxides or diacylperoxides, such as diacetylperoxide, acetylbenzoylperoxide, dilauroylperoxide, dibenzoylperoxide, bis-2,4-dichlorobenzoylperoxide; dialkylperoxides, such as di-tertiary butylperoxide; peralkanoic acid esters, such as isopropyl peracetate, tert.-butyl peracetate, tert.-butyl peroctoate, tert.-butyl perpivalate; dialkylperoxy dicarbonates, such as diisopropylperoxy dicarbonate, diethylhexylperoxy dicarbonate, dicyclohexylperoxy dicarbonate, diethylcyclohexylperoxy dicarbonate, dicetylperoxy dicarbonate, di-t-butylcyclohexylperoxy dicarbonate; mixed anhydrides of organic sulfoper acids and organic acids, such as acetylcyclohexyl-sulfonylperoxide; $\alpha$-alkyl-substituted acyl peroxides; as well as azo compounds known as polymerization catalysts, for example, azoisobutyric dinitrile. Preferably $\alpha$-alkyl-substituted acyl peroxides and/or dialkylperoxy dicarbonates with alkyl radicals with over 5 carbon atoms are used. The catalysts can be used individually or in mixture. The amounts are generally from 0.01 to 3 percent by weight, preferably 0.01 to 0.3 percent by weight, based on the monomers. The catalysts can be charged with the monomers or be dosed in during the polymerization, if necessary, together with further monomers.

As dispersing agents or suspension stabilizers including protective colloids can be used both protective colloids and finely dispersed solids or emulsifiers, as well as combinations of the above-mentioned substances. The suspension aids are added in amounts of 0.04 to 1 percent by weight, based on the water content. Examples are polyvinyl alcohol, which can contain up to 40 mol percent of acetyl groups, water-soluble cellulose derivatives and ethers, such as methyl cellulose, carboxymethyl cellulose, hydroxyethyl cellulose, and methylhydroxy-propyl cellulose, as well as water-soluble salts of copolymers of maleic anhydride or its half esters with styrene. Furthermore, emulsifiers can be used in addition to the protective colloids. The emulsifiers can be anionic, cationic, amphoteric or non-ionic.

Examples of finely dispersed solids which can be used as dispersing agents are: barium sulfate, calcium carbonate, magnesium carbonate, apatite, hydroxyl apatite, bentonite, silica, finely dispersed plastics, for example, PVC.

Furthermore, the usual aids can be added to the polymerization charge, either all at once or dosed in, for example, buffer compounds, such as sodium bicarbonate, soda, alkali metal acetates, alkali metal phosphates; or molecular weight regulators, such as aliphatic aldehydes or alkanals with 2 to 4 carbon atoms, chlorinated hydrocarbons, such as di- and tri-chloroethylene, chloroform, methylene chloride and mercaptans.

Principally the use of any water-soluble reducing agent is possible in the method of the invention. In general, however, a reducing agent is selected which has no negative properties and which remains of economical interest. Preferred is the use of reducing oxygen acids of sulfur, phosphorus, nitrogen, and/or their water-soluble salts, preferably their alkali metal salts. Examples are sulphurous acids, sulfites, bisulfites, thiosulfates, dithionites, sulfoxylates, hypophosphites and nitrites. The anion of the salts used plays no part therein as long as the salt is water soluble. Examples of other reducing compounds are urea, thiourea, hydrazine, hydroxylamine, formate, formic acid, tin compounds, and their water-soluble derivatives. Reducing compounds which are soluble, though only slightly, in monomers, as it is the case in many organic reducing agents, are just as effective, as far as the prevention of wall deposit is concerned, as compounds which are practically only water soluble. However, they inhibit to a certain extent the reaction and require the use of the larger amount of catalyst.

Preferably the polymerization is effected at a pH-valve of the aqueous phase at which the reducing agent or agents used have the optimum effect.

The polymerization is carried out in reactors which have a particularly low mean peak-to-valley height. It is at most 10 $\mu$, preferably 1 $\mu$. Such reactors are frequently enameled or they consist of bright-polished refined steel. Mostly they are autoclaves or tubular reactors. They can contain baffle plates, current disturbers, thermometer tubes and valves. The necessary flow velocity of at least 0.3 m/sec., preferably 1 m/sec., is maintained adjacent to all inner surfaces of the reactors by stirring or pumping means. The term "adjacent to the inner surface" means the velocity of flow in the proximity of these surfaces, since on the inner surfaces themselves the velocity of flow must naturally be zero. The flow is best if it extends parallel to the surfaces to be kept free. Examples of suitable stirring means are, for example, impellers, turbine-stirrers, propellers, but also pumps of various designs. The steadiest flow is achieved with a propeller in connection with a conduit tube inside the entire reactor.

The polymerizates produced can be utilized in all forms of utilizations previously employed for suspension polymerized in vinyl halides.

The following examples are illustrative of the invention without being limitative in any manner.

EXAMPLE 1

A stirring autoclave of bright-polished V4A-steel with a mean peak-to-valley height of 0.8 $\mu$, which contains current disturbers and an impeller stirrer whose diameter corresponds to 80 percent of the inside diameter of the autoclave, was charged with 62 parts of a 0.13 percent solution of methyl cellulose in water. Then 0.03 parts by weight of sodium hydrogen carbonate and 0.001 parts by weight of sodium thiosulfate were added. The autoclave was evacuated, and the solution was stirred for 5 minutes at 300 rpm. After charging with 38 parts by weight of vinyl chloride, the solution was stirred again for 5 minutes. Then 0.04 parts by weight of di-ethylhexylperoxy dicarbonate were added under stirring and the autoclave was heated to 53°C. The flow velocity in the autoclave was 1 m/sec. After 5 hours the reaction was stopped with monomer conversion of 85 percent by distilling off the remaining vinyl chloride.

The product shows excellent thermal stability and plasticizer absorption. The number of specks (3–4/100 cm$^2$) was less than in a product produced without a reducing agent and thus in the presence of wall deposits. The autoclave nowhere showed a wall deposit. The stirrers and current disturbers were likewise not covered. Even after 20 repetitions of this polymerization without intermediate cleaning, the autoclave still showed no wall deposits.

EXAMPLE 2

Example 1 was repeated but with the omission of the sodium thiosulfate. All surfaces of the autoclave were covered with a thin film which was very difficult to remove. At the phase boundary, on the stirrers and current disturbers there were additional thick incrustations. The PVC obtained had considerably more specks (30–35/100 cm$^2$) than the product obtained according to Example 1.

EXAMPLE 3

Example 1 was repeated and only the speed of the stirrer was kept during the polymerization at 100 rpm (corresponds to a flow velocity of 0.1 m/sec.). The autoclave showed incrustations almost everywhere, but there was no continuous film, as it is found when no reducing agent was used.

EXAMPLE 4

In analogy to Example 1, 34 parts by weight of vinyl chloride and 4 parts by weight of vinyl acetate were polymerized. As a catalyst, 0.1 parts by weight of dicetyl-peroxy dicarbonate and as a reducing agent, 0.04 parts by weight of sodium hydrogen phosphite were used. Here too there were no small deposit.

EXAMPLE 5

Example 1 was repeated but 0.01 parts by weight of sodium hydrogen sulfite were used as a reducing agent. Also, instead of sodium bicarbonate, 0.03 parts by weight of sodium hydrogen phosphate and 0.01 parts by weight of disodium hydrogen phosphate were used as buffer substances. The result was just as good as in Example 1. After 20 charges without any cleaning there was still no polymer deposits.

EXAMPLE 6

Similar to Example 1 a charge was polymerized which contained 0.01 parts by weight of sodium dithionite as the reducing agent. No wall deposit was found.

The preceding specific embodiments are illustrative of the practice of the invention. It is to be understood, however, that other expedients known to those skilled in the art or disclosed herein may be employed without deparing from the spirit of the invention or the scope of the appended claims.

We claim:

1. In the suspension polymerization process for the production of polymerizates containing at least 70 percent of polyvinyl halides, with low polymer deposits, which comprises the steps of mixing (1) monomers selected from the group consisting of vinyl halides and mixtures of vinyl halides with up to 30 percent by weight of olefinically unsaturated compounds copolymerizable with vinyl halides, (2) an oil-soluble free-radical-forming polymerization catalyst, (3) suspension stabilizers including protective colloids, and (4) water, heating said mixture under agitation to a polymerization temperature of between 30°C and 80°C, and recovering said polymerizate, of the improvement which consists of conducting said polymerization in the presence of from 10 to 300 ppm, based on the water content, of water-soluble reducing agents, in a reactor whose inner surface has a mean peak-to-valley height of at most 1 $\mu$ and where the flow velocity adjacent said inner surface is at least 0.3 m/sec., whereby a polymerizate is recovered substantially without polymer deposits.

2. The process of claim 1 wherein said flow velocity adjacent said inner surface is at least 1 m/sec.

3. The process of claim 1 wherein said water with all water-soluble ingredients is charged first, then the said monomers and thereafter said polymerization catalyst are charged.

4. The process of claim 1 wherein said water-soluble reducing agent is selected from the group consisting of reducing oxygen acids of sulfur, reducing oxygen acids of phosphorus, reducing oxygen acids of nitrogen, and their water-soluble salts.

5. The process of claim 1 wherein said polymerization is effected at a pH which is optimum for said water-soluble reducing agents.

6. The process of claim 1 wherein said oil-soluble free-radical-forming polymerization catalyst is selected from the group consisting of α-alkyl-substituted acyl peroxides, dialkylperoxy dicarbonates having from 6 to 22 carbon atoms in the alkyls, and mixtures thereof.

* * * * *